US007912641B2

(12) United States Patent
Osentoski et al.

(10) Patent No.: US 7,912,641 B2
(45) Date of Patent: Mar. 22, 2011

(54) VEHICULAR FLEET MONITORING VIA PUBLIC WIRELESS COMMUNICATION ACCESS POINTS USING COMPRESSED DIAGNOSTIC DATA SETS AND REDUCED LATENCY TRANSMISSIONS

(75) Inventors: Lawrence Edward Osentoski, Clarkston, MI (US); Michael A Cummins, Shelby Township, MI (US); Vijay Padmanabhan, Johnstown, PA (US); Michael Joseph Grattan, Sidman, PA (US); John Charles Zlater, Johnstown, PA (US); Paul Anthony Krasicky, Clinton Township, MI (US); Aaron Robertson Harris, Sterling Heights, MI (US)

(73) Assignee: MTS Technologies, Inc., Arlington, VA (US)

( * ) Notice: Subject to any disclaimer, the term of this patent is extended or adjusted under 35 U.S.C. 154(b) by 946 days.

(21) Appl. No.: 11/763,437

(22) Filed: Jun. 14, 2007

(65) Prior Publication Data

US 2007/0294033 A1 Dec. 20, 2007

Related U.S. Application Data

(60) Provisional application No. 60/804,714, filed on Jun. 14, 2006.

(51) Int. Cl.
*G01C 21/00* (2006.01)

(52) U.S. Cl. .................. 701/213; 701/207; 340/539.13; 455/345

(58) Field of Classification Search .................. 701/207, 701/213–216, 200; 340/539.13, 988–989, 340/992, 3.1, 3; 455/345, 99
See application file for complete search history.

(56) References Cited

U.S. PATENT DOCUMENTS

| | | | | |
|---|---|---|---|---|
| 6,768,994 | B1 * | 7/2004 | Howard et al. | 1/1 |
| 6,954,689 | B2 * | 10/2005 | Hanson et al. | 701/33 |
| 7,257,413 | B2 * | 8/2007 | Sheynblat | 455/456.1 |
| 7,317,975 | B2 * | 1/2008 | Woolford et al. | 701/33 |
| 7,346,439 | B2 * | 3/2008 | Bodin | 701/36 |
| 2002/0116107 | A1 * | 8/2002 | Mahoney et al. | 701/50 |
| 2002/0156558 | A1 * | 10/2002 | Hanson et al. | 701/33 |
| 2004/0073440 | A1 * | 4/2004 | Garbers et al. | 705/1 |
| 2004/0093291 | A1 * | 5/2004 | Bodin | 705/35 |
| 2004/0142722 | A1 * | 7/2004 | Everett | 455/550.1 |

(Continued)

FOREIGN PATENT DOCUMENTS

AU 2008269345 A1 * 12/2008

(Continued)

OTHER PUBLICATIONS

An equipment health monitoring and fleet dispatching system for logging trucks; Young, G.G.; Sauder, B.J.; Vehicle Navigation and Information Systems Conference, 1989. Conference Record; Digital Object Identifier: 10.1109/VNIS.1989.98767 Publication Year: 1989.*

(Continued)

*Primary Examiner* — Cuong H Nguyen
(74) *Attorney, Agent, or Firm* — Mark Young, P.A.

(57) ABSTRACT

A vehicular monitoring system is configured to acquire GPS position data and vehicular operating data, write the data to a file, and detect and utilize public wireless communication (e.g., 802.11x/WiFi) Internet access points to communicate the file containing the acquired GPS position data and vehicular operating data to a remote computer. Compressed diagnostic data sets and reduced latency wireless transmissions are utilized to facilitate communication.

20 Claims, 6 Drawing Sheets

U.S. PATENT DOCUMENTS

| | | | | |
|---|---|---|---|---|
| 2005/0096810 | A1 * | 5/2005 | Mahoney et al. | 701/29 |
| 2005/0171660 | A1 * | 8/2005 | Woolford et al. | 701/33 |
| 2007/0077945 | A1 * | 4/2007 | Sheynblat | 455/456.5 |
| 2007/0270168 | A1 * | 11/2007 | Sheynblat | 455/456.6 |
| 2007/0294033 | A1 * | 12/2007 | Osentoski et al. | 701/213 |
| 2008/0084332 | A1 * | 4/2008 | Ritter et al. | 340/989 |
| 2008/0086391 | A1 * | 4/2008 | Maynard et al. | 705/28 |
| 2008/0086509 | A1 * | 4/2008 | Wallace | 707/104.1 |
| 2008/0252487 | A1 * | 10/2008 | McClellan et al. | 340/936 |
| 2008/0255722 | A1 * | 10/2008 | McClellan et al. | 701/35 |
| 2008/0258890 | A1 * | 10/2008 | Follmer et al. | 340/439 |
| 2008/0262670 | A1 * | 10/2008 | McClellan et al. | 701/29 |
| 2008/0294690 | A1 * | 11/2008 | McClellan et al. | 707/104.1 |
| 2008/0319602 | A1 * | 12/2008 | McClellan et al. | 701/33 |
| 2009/0015373 | A1 * | 1/2009 | Kelly et al. | 340/5.62 |
| 2009/0051510 | A1 * | 2/2009 | Follmer et al. | 340/425.5 |
| 2009/0099898 | A1 * | 4/2009 | Ehrman et al. | 705/9 |
| 2009/0273469 | A1 * | 11/2009 | Koen | 340/539.13 |
| 2009/0326991 | A1 * | 12/2009 | Wei et al. | 705/5 |
| 2010/0022255 | A1 * | 1/2010 | Singhal | 455/457 |
| 2010/0211249 | A1 * | 8/2010 | McClellan | 701/29 |
| 2010/0211340 | A1 * | 8/2010 | Lowenthal et al. | 702/63 |
| 2010/0228428 | A1 * | 9/2010 | Harshbarger et al. | 701/33 |

FOREIGN PATENT DOCUMENTS

| | | | | |
|---|---|---|---|---|
| CA | 2607465 | A1 | * | 4/2008 |
| EP | 780273 | A1 | * | 6/1997 |
| FR | 2721776 | A1 | * | 12/1995 |
| FR | 2734928 | A1 | * | 12/1996 |
| GB | 2407918 | A | * | 5/2005 |
| JP | 2009506678 | W | * | 2/2009 |
| TW | 200539715 | A | * | 12/2005 |
| WO | WO 02075667 | A1 | * | 9/2002 |
| WO | WO 0387971 | A2 | * | 10/2003 |
| WO | WO 2007025159 | A2 | * | 3/2007 |
| WO | WO 2009052210 | A2 | * | 4/2009 |
| WO | WO 2009073945 | A1 | * | 6/2009 |
| WO | WO 2010096506 | A1 | * | 8/2010 |

OTHER PUBLICATIONS

Monitor—An automatic bus location and communications system for Chicago; Wiksten, C.L.; Brown, C.P.; Vehicular Technology Conference, 1980. 30th IEEE; vol. 30; Digital Object Identifier: 10.1109/VTC.1980.1622843 Publication Year: 1980 , pp. 407-412.*

A service oriented system for fleet management and traffic monitoring; Giacobbe, M.; Puliafito, A.; Villari, M.; Computers and Communications (ISCC), 2010 IEEE Symposium on; Digital Object Identifier: 10.1109/ISCC.2010.5546553 Publication Year: 2010 , pp. 784-786.*

Structure of a simple but effective bus fleet management system; Harper, J.G.; Sweeney, D.; Intelligent Vehicles '94 Symposium, Proceedings of the; Digital Object Identifier: 10.1109/IVS.1994.639569; Publication Year: 1994 , pp. 504-508.*

An application of AVM electronics hardware to fire department dispatching; Cisco, D.O.; Vehicular Technology Conference, 1981. 31st IEEE; vol. 31; Digital Object Identifier: 10.1109/VTC.1981.1622948; Publication Year: 1981 , pp. 312-314.*

Automatic vehicle monitoring: A tool for vehicle fleet operations; Symes, D.J.; Vehicular Technology, IEEE Transactions on vol. 29 , Issue: 2; Digital Object Identifier: 10.1109/T-VT.1980.23846; Publication Year: 1980 , pp. 235-237.*

IEE Colloquium on 'Vehicle Location and Fleet Management Systems' (Digest No. 112); Vehicle Location and Fleet Management Systems, IEE Colloquium on ; Publication Year: 1993.*

Real-time aid to decision system for bus operators; Scemama, G.; Balbo, F.; Caruso, M.; Rodriguez, J.; Tendjaoui, M.; Road Transport Information and Control, 2000. Tenth International Conference on (Conf. Publ. No. 472); Digital Object Identifier: 10.1049/cp:20000132; Publication Year: 2000 , pp. 200-204.*

Integrated automatic vehicle location and position reporting system; Banks, K.M.; Road Traffic Monitoring, 1989., Second International Conference on; Publication Year: 1989 , pp. 195-199.*

Geofencing for fleet & freight management ; Reclus, F.; Drouard, K.; Intelligent Transport Systems Telecommunications,(ITST),2009 9th International Conference on; Digital Object Identifier: 10.1109/ITST.2009.5399328 Publication Year: 2009 , pp. 353-356.*

Automatic vehicle location (AVL) for transit operation; Greenfeld, J.; Electrotechnical Conference, 2000. MELECON 2000. 10th Mediterranean; vol. 2; Digital Object Identifier: 10.1109/MELCON.2000.880019; Publication Year: 2000 , pp. 656-659 vol. 2.*

Remote fleet management for police cruisers; Kim, S.Y.; Wilson-Remmer, K.; Kun, A.L.; Miller, W.T., III; Intelligent Vehicles Symposium, 2005. Proceedings. IEEE; Digital Object Identifier: 10.1109/IVS.2005.1505073 Publication Year: 2005 , pp. 30-35.*

Automatic vehicle monitoring: A tool for vehicle fleet operations; Symes, D.J.; Vehicular Technology, IEEE Transactions on vol. 29, Issue: 2; Digital Object Identifier: 10.1109/T-VT.1980.23846; Publication Year: 1980, pp. 235-237.*

Traffic data for local emissions monitoring at a signalized intersection; Bigazzi, Alexander; Van Lint, J.W.C.; Klunder, Gerdien; Stelwagen, Uilke; Ligterink, Norbert; Intelligent Transportation Systems (ITSC), 2010 13th International IEEE Conference on Digital Object Identifier: 10.1109/ITSC.2010.5625302; Publication Year: 2010 , pp. 210.*

A distributed measurement system for smart monitoring of vehicle activities; Di Lecce, V.; Amato, A.; Instrumentation and Measurement Technology Conference (I2MTC), 2010 IEEE; Digital Object Identifier: 10.1109/IMTC.2010.5488206 Publication Year: 2010, pp. 903-907.*

A vehicle management system; Harrison, C.G.; Automotive Radar and Navigation Techniques (Ref. No. 1998/230), IEE Colloquium on; Digital Object Identifier: 10.1049/ic:19980194; Publication Year: 1998 , pp. 8/1-8/4.*

Intelligent Fleet Management System with Concurrent GPS & GSM Real-Time Positioning Technology; Thong, S.T.S.; Chua Tien Han; Rahman, T.A.; Telecommunications, 2007. ITST '07. 7th International Conference on ITS; Digital Object Identifier: 10.1109/ITST.2007.4295849; Publication Year: 2007 , pp. 1-6.*

* cited by examiner

| LED State Descriptions | | | |
|---|---|---|---|
| **Green** | **Red** | **Amber** | **Meaning** |
| On | Any | Any | The unit 200 is powered up. |
| On | Flashing | Any | The red LED flashes 2-3times per second when any CAN data is received. This light will flash approximately every two seconds as CAN messages are received at different I times to check key position, create file header information and obtain data. |
| On | Any | On | A valid GPS signal has been obtained. |
| Flashing | Flashing | Flashing | A file has successfully been sent over the wireless connection. All three LEDs will flash in sync three times. |
| Off | Off | On | Pre-shutdown; tasks are given time to finish. This lasts for 4 seconds. |
| On | On | On | Unit has disabled CAN and is waiting to shutdown. At the end of a 27 second period the unit 200 will power off if there is no CAN bias from the vehicle. If there is still a CAN bias, the unit 200 restarts. |

FIGURE 4

| Fields | # of Bytes | Description |
|---|---|---|
| Unit serial number | 4 | All digit serial number |
| Software Version | 4 | All digit version and release number. Upper two bytes are version bytes and lower two bytes are the release number. |
| Configuration File Name | 8 | All Digit Config ID (upper 4 bytes are reserved as all 0 values) |
| Date - month | 2 | month = 0 to 12 |
| - day | 2 | day = 1 to 31 |
| - year | 4 | year = 00 to max 4 byte value |
| File Type (1-FF) | 1 | 1 = Histogram file<br>2 = Event Counter File<br>3 = Time in State File<br>4 = Raw Data File<br>5 = Trigger Only<br>6 = Safety File<br>7 = Probe File<br>8 = Master ID<br>9 = Error<br>A = Fault and Freeze Frame<br>B to FF = undefined |
| Hardware Version | 1 | All Digit hardware version |
| Reserved | 10 | |

FIGURE 5

| Parameter | CAN Request String | Conversion Factor |
|---|---|---|
| Ambient Temperature (degrees C)<br>Speed (mph) | 0x7E0 03 22 01 B6<br>0x7E0 03 22 03 D5 | (hex value) -64<br>(hex value) |
| Engine Odometer High (miles) | 0x7E0 03 22 04 3B | (hex value) * 8.192 |
| Engine Odometer Low (miles) | 0x7E0 03 22 04 3C | (hex value) * 0.032 |
| FCM Odometer (kilometers) | 0x620 02 21 A3 | (hex value) * 0.1 |
| Wiper Status | 0x620 02 2 1 A1 | 0x01 = intermittent speed 1<br>0x02 = intermittent speed 2<br>0x03 = intermittent speed 3<br>0x04 = intermittent speed 4<br>0x05 = intermittent speed 5<br>0x06 = intermittent speed 6<br>0x0D = low speed<br>0x0E = high speed |
| Barometric Pressure (in. Hg) | 0x7E0 03 22 01 70 | (hex value) * 0.059 |

FIGURE 6

VEHICULAR FLEET MONITORING VIA PUBLIC WIRELESS COMMUNICATION ACCESS POINTS USING COMPRESSED DIAGNOSTIC DATA SETS AND REDUCED LATENCY TRANSMISSIONS

RELATED APPLICATION

This application claims the benefit of priority of U.S. provisional application 60/804,714, filed Jun. 14, 2006, the entire contents of which are incorporated herein by this reference.

FIELD OF THE INVENTION

This invention relates generally to vehicle tracking, and, more particularly, to a system and method for vehicular fleet monitoring via public wireless communication access points using compressed diagnostic data sets and reduced latency transmissions.

BACKGROUND

GPS tracking systems have grown in popularity in recent years. A conventional tracking system uses a GPS navigational device to determine the location of a vehicle or other mobile object and to record the position at determined times, intervals or conditions in order to create a track file or log of activities. The recorded data can be stored within a GPS tracking unit for subsequent access and use, or it may be transmitted to a central location, or internet-connected computer. Illustratively, the data may be communicated using a cellular, radio, or satellite modem embedded in the tracking unit. This allows the data to be reported in real-time, using either web browser based tools or customized software.

Some tracking units are interfaced to receive signals and store data representative of output from various sensors provided on vehicles. In addition to tracking a vehicle's location at any time, such systems may store operating data such as speed, rpm, engine temperature and other parameters which are sensed and processed by sensors and electronic control units of modern vehicles.

Wireless hotspots have also grown in popularity in recent years. Hotspots are locations where compatible computers (such as laptops, PDAs or other properly equipped computing devices) may communicate via high frequency radio signals with a wireless local area network (WLAN/Wi-Fi) equipped with a public wireless access point (WAP) in accordance with a compatible wireless standard (e.g., IEEE 802.11x) to conveniently connect to the Internet. Hotspots are often found near restaurants, train stations, hotels, airports, cafés, libraries and other public places. Many such hotspots are open (i.e., publicly accessible) and available free of charge.

Despite the proliferation of hotspots, to date they have not been used a primary means for vehicle tracking. Shortcomings of hotspots, which include limited capacity and range, have forestalled widespread adoption and use for vehicle tracking. By way of example, a typical IEEE 802.11 WAP may communicate with up to about 30 client systems located within a radius of about 100 meters. Even this limited range of communication can vary substantially, depending on such variables as indoor or outdoor placement of the WAP, height above ground, nearby obstructions, other electronic devices that might actively interfere with the signal by broadcasting on the same frequency, the type of antenna(s), the current weather, operating radio frequency, and the power output of devices.

As a further complication, a traveling vehicle may spend only a few seconds within the range of an available hotspot. This provides an extremely narrow window of opportunity to communicate accumulated tracking data.

To avoid the aforementioned limitations of hotspots, most conventional tracking systems depend upon alternative forms of wireless communication, such as cellular. While such forms of communication are effective for vehicle tracking, they tend to be more costly to deploy, operate and maintain.

A tracking system that can take advantage of freely available public hotspots is needed. The system should be configured to automatically detect the presence of an available hotspot and communicate efficiently using compressed diagnostic data sets and reduced latency transmissions.

The invention is directed to fulfilling one or more of the needs and overcoming one or more of the problems as set forth above.

SUMMARY OF THE INVENTION

To overcome one or more of the problems as set forth above, in one aspect of the invention, a vehicular monitoring system is provided. The system is configured to acquire GPS position data and vehicular operating data, write the data to a file, and detect and utilize public wireless communication (e.g., 802.11x/WiFi) Internet access points to communicate the file containing the acquired GPS position data and vehicular operating data to a remote computer. Compressed diagnostic data sets and reduced latency wireless transmissions are utilized to facilitate communication.

In one aspect of an exemplary vehicle tracking unit, a microcontroller, a GPS receiver with a corresponding GPS antenna, a wireless network transceiver with a corresponding wireless network antenna, a memory, a power supply and one or more interfaces operably coupled by a bus, are all provided. The microcontroller is adapted to provide supervisory logic control over the tracking unit; control the GPS receiver and wireless network transceiver; receive input from the GPS receiver, wireless transceiver and interfaces; and write to and read from the memory. The GPS receiver is adapted to receive GPS satellite signals and calculate position and time. The interfaces provide means for communicatively coupling the microcontroller to a vehicle Electronic Control Unit and sensors and receiving signals corresponding to operational data. The bus is adapted to enable transfer of data and power between components. The microcontroller is also adapted to create a file, including a header and data pairs comprised of location data and corresponding operational parameter data. The header includes a vehicle identifier and a tracking unit identifier. The wireless network transceiver is adapted to detect open compatible wireless network connections with Internet access and transmit the file to a remote computer via a detected open wireless access point with an Internet connection using a determined file transfer protocol.

In one aspect of an exemplary method of tracking a vehicle according to principles of the invention, a location of a vehicle is determined using a global positioning system. A time is also determined at which the location of the vehicle is determined. Operational parameters of the vehicle are determined at the determined time. A data file is created, including a header and data pairs comprised of location data and the corresponding operational parameter data. The header includes a vehicle identifier and a tracking unit identifier. Open compatible wireless network connections with Internet access are detected when available. A detected open compatible wireless network connection is accessed and utilized for transmitting the data file to a remote computer via the Internet using a compatible file transfer protocol.

In another aspect of the invention, a method of tracking a vehicle using a system and method for vehicular fleet monitoring as described herein includes determining a location of a vehicle using a global positioning system, determining a time at which the location of the vehicle is determined, determining at least one operational parameter of the vehicle at the determined time, creating a data file includes a header and at least one data pair, the at least one data pair includes the determined location of the vehicle and the corresponding at least one operational parameter, the header including a vehicle identifier and a tracking unit identifier, determining when an open compatible wireless network connection with Internet access is available, and accessing the open compatible wireless network connection and transmitting the data file to a remote computer via the Internet using a compatible file transfer protocol.

In another aspect of the invention, a method further includes steps of powering up and shutting down the system based upon a CAN line bias. The system may be powered up when the CAN line bias is at least a first determined threshold amount, and the system may be powered down when the CAN line bias drops below a second determined threshold amount. Such bias may correspond to states of the vehicle's ignition.

In another aspect of the invention, the at least one operational parameter is requested periodically. Location may be determined whenever the at least one operational parameter is determined.

In another aspect of the invention, system status is visibly indicated.

In another aspect of the invention, the at least one data pair includes the determined location of the vehicle and the corresponding at least one operational parameter and the header includes a vehicle identifier and a tracking unit identifier. Each data pair is appended to the data file until the data file is transmitted. Upon transmission a new data file is created. A file name is created for each data file, which file name includes a date, an identification number for the system and a count number for the date.

In another aspect of the invention, an almanac is created. The almanac includes GPS satellite information. Date and time information are determined from UTC time.

In another aspect of the invention, each of the at least one data pair includes a time of data collection, latitude, longitude, groundspeed and altitude and at least one operational parameter from the group consisting of ambient temperature, vehicle speed, odometer reading, windshield wiper status and barometric pressure. The operational parameter is written to the data file as a raw recorded hexadecimal value which may then be converted from the raw recorded hexadecimal value to actual units by applying a determined conversion factor.

In another aspect of the invention, the vehicle tracking unit includes a microcontroller, a GPS receiver with a corresponding GPS antenna, a wireless network transceiver with a corresponding wireless network antenna, a memory, a power supply and one or more interfaces operably coupled by a bus. The microcontroller is adapted to provide supervisory logic control over the tracking unit, control the GPS receiver and wireless network transceiver, receive input from the GPS receiver, wireless transceiver and interfaces, and write to and read from the memory. The GPS receiver is adapted to receive GPS satellite signals and calculate position and time based thereon. The one or more interfaces include a means for communicatively coupling the microcontroller to a vehicle Electronic Control Unit and receiving operational data therefrom. The bus is adapted to enable transfer of data and power between components. The wireless network transceiver is adapted to detect and transmit GPS and operational data to a remote computer via an open wireless access point with an Internet connection using a determined file transfer protocol. The microcontroller is configured to determine a location of the vehicle using GPS receiver, determine a time at which the location of the vehicle is determined, determining at least one operational data of the vehicle at the determined time, and create a data file that includes a header and at least one data pair. The at least one data pair includes the determined location of the vehicle and the corresponding at least one operational data. The header includes a vehicle identifier and a tracking unit identifier. The microcontroller is configured to determine when an open compatible wireless network connection with Internet access is available using the wireless network transceiver and then access the open compatible wireless network connection and transmit the data file, using the wireless network transceiver, to a remote computer via the Internet using a compatible file transfer protocol. The data file may include a plurality of data pairs appended to the data file until the data file is transmitted. The microcontroller may be configured to create a new data file upon transmission the data file, and configured to create a file name for each data file the file name including a date, an identification number for the unit and a count number for the date.

In another aspect of the invention, each of the at least one data pair includes a time of data collection, latitude, longitude, groundspeed and altitude and at least one operational parameter from the group consisting of ambient temperature, vehicle speed, odometer reading, windshield wiper status and barometric pressure, the method further includes writing the operational parameter to the data file as a raw recorded hexadecimal value.

In another aspect of the invention, the microcontroller may be configured to create an almanac using the GPS receiver. The almanac including almanac data corresponding to the GPS satellite signals.

BRIEF DESCRIPTION OF THE DRAWINGS

The foregoing and other aspects, objects, features and advantages of the invention will become better understood with reference to the following description, appended claims, and accompanying drawings, where:

FIG. 4 provides a table of exemplary LED state descriptions according to principles of the invention; and FIG. 5 provides a table of exemplary first line header data according to principles of the invention; and FIG. 6 provides a table of exemplary conversion factors for converting recorded hex values to sensed data.

Those skilled in the art will appreciate that the invention is not limited to the exemplary embodiments depicted in the figures or the shapes, relative sizes, proportions or materials shown in the figures.

DETAILED DESCRIPTION

An exemplary system and methodology according to principles of the invention enable vehicular fleet monitoring and safety applications via public wireless communication (802.11/WiFi) access points through use of compressed diagnostic data sets and reduced latency wireless transmissions. The combination of optimized data formatting and latency modifications to the standard FTP (File Transfer Protocol) operations enable the use of public WiFi access points to transmit real time data in a manner that emulates the connectivity of interconnected wireless networks with greater geographic footprint and wireless transmission characteristics such as cellular and satellite wireless media.

Figure 1:
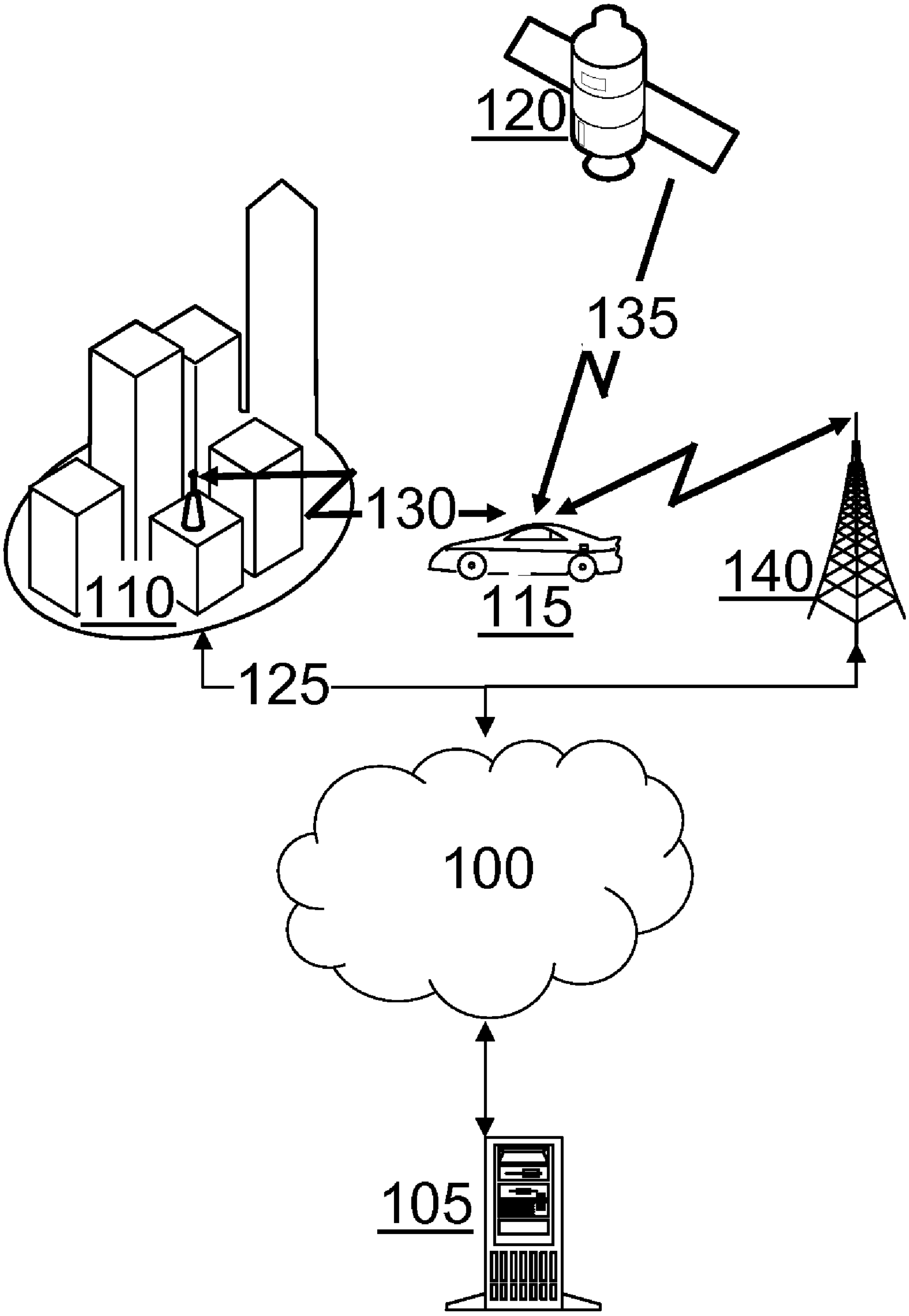
FIG. 1 provides a high level block diagram that conceptually illustrates an exemplary environment in which a vehicle tracking unit according to principles of the invention may be utilized.
Figure 2:
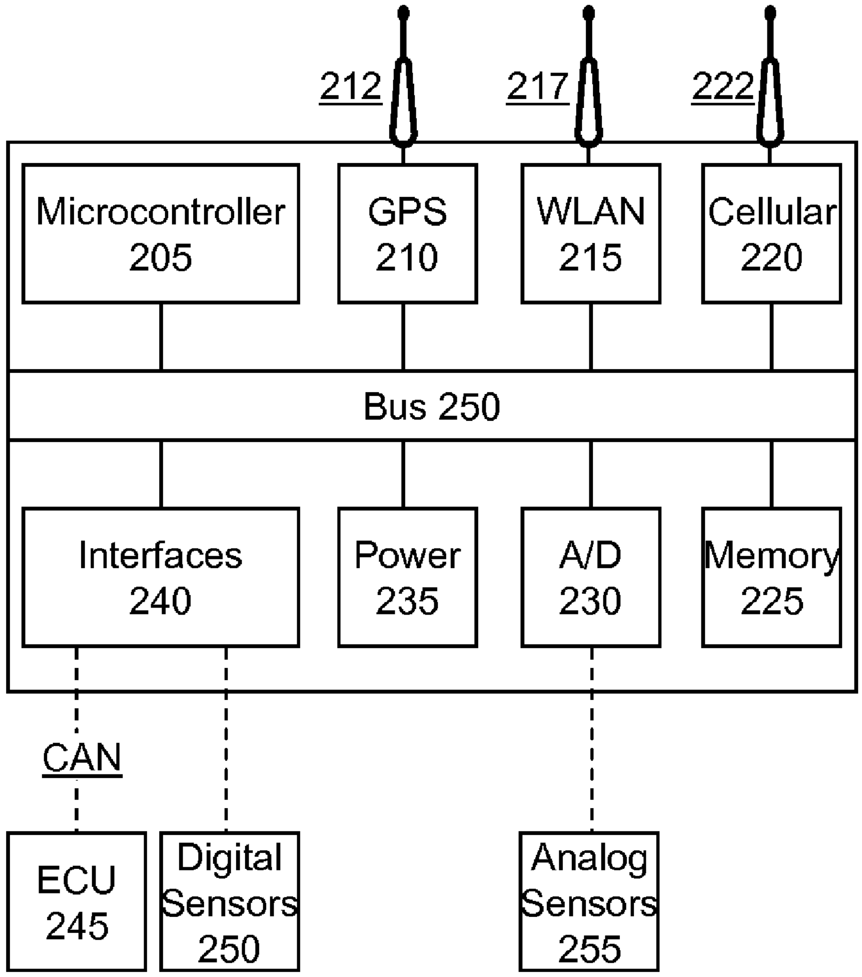
FIG. 2 provides a high level block diagram of an exemplary vehicle tracking unit according to principles of the invention.

With reference to FIG. 1, an exemplary environment for implementing an exemplary vehicle tracking unit 200, and components thereof, according to principles of the invention is conceptually illustrated. A mobile vehicle 115 such as an automobile or truck is equipped with a vehicle tracking unit 200 as shown in FIG. 2. The vehicle tracking unit 200 is configured for collecting operational and location data, writing the data to files in a determined format, and communicating the files to an available wireless access point 110, via a compatible wireless communication protocol 130 (e.g., 802.11x). Location data is provided via wireless satellite communication 135 from a plurality of GPS satellites 120. Operational data is provided via an ECU, CAN and sensors located on the vehicle 115. The vehicle tracking unit 200 may also be configured for communicating the data via other modes of communication such as cellular 140. The wireless access point 110 and cell tower 140 in turn communicate the files through other networks, including land lines and switching centers, through computers that provide gateway services (i.e., access) to the Internet 100 and ultimately to a backend server 105 for processing, storage, reporting based upon data contained in the files.

The backend server 105 receives, manages and processes files from a plurality of mobile tracking units 200. Files from the vehicle tracking units 200 are delivered to the server 105 through one or more networks including the Internet 100. A database coupled to the server 105 may store data from files provided by the vehicle tracking units 200. The server 105 may then utilize the data for analyses and reporting.

Referring now to FIG. 2, a high level block diagram of an exemplary vehicle tracking unit 200, and components thereof, according to principles of the invention is provided. The tracking unit comprises a microcontroller 205, a GPS receiver 210 with a corresponding GPS antenna 212, a wireless local area network (WLAN) transceiver 215 with a corresponding WiFi antenna 217, a cellular modem 220 with a corresponding cellular antenna 222, memory 225, an analog/digital converter 230, a power supply 235, and one or more interfaces 245 communicatively coupled by a bus 250. The microcontroller 205, which provides supervisory logic control over the tracking unit 200, is configured for controlling the GPS receiver 210 and wireless transceiver 215; receiving input from the GPS receiver 210, wireless transceiver 215 and interfaces 245; and writing to and reading from the memory 220. The GPS receiver 210 receives GPS satellite signals and calculates current position (latitude, longitude, elevation), and precise time, using a process of trilateration, which may optionally be enhanced by any of various improvement techniques such as Differential GPS (DGPS), Wide Area Augmentation System (WAAS), Euro Geostationary Navigation Overlay Service (EGNOS), Multi-Functional Satellite Augmentation System (MFSAS), Local Area Augmentation System (LAAS), Carrier-Phase Enhancement (CPGPS), Wide Area GPS Enhancement (WAGE), Relative Kinematic Positioning (RKP). The bus 250 transfers data and/or power between components. The WLAN transceiver 215 transmits and receives data to and from a wireless access point (WAP) using a compatible protocol such as the 802.11b or 802.11g standards at 2.4 GHz or the 802.11a standard at 5 GHz. The cellular modem 220 is configured for communication over a cellular-telephone or cell-based network using a compatible communication protocols such as, but not limited to Global System for Mobile Communications (GSM), General Packet Radio Service (GPRS), Code Division Multiple Access (CDMA), Evolution-Data Optimized (EV-DO), Enhanced Data Rates for GSM Evolution (EDGE), 3GSM, Digital Enhanced Cordless Telecommunications (DECT), Digital AMPS (IS-136/TDMA), and Integrated Digital Enhanced Network (iDEN) and others. The memory 225 may include volatile and/or non-volatile memory for storing data. A mass data storage device such as a hard disk may also be provided. The analog/digital converter 230 converts continuous/analog signals from analog sensors 255 to discrete digital signals for processing by the microcontroller 205. The power supply 235 may be comprised of one or more rechargeable or disposable batteries, and/or connections to the electric power system of the vehicle. The interfaces 245 include parallel and/or serial ports, network interface cards and/or other means for communicative coupling to digital sensors 250 and/or a vehicle's Controller Area Network (CAN) connected to the vehicle's Electronic Control Unit (ECU) 245.

The exemplary vehicle tracking unit 200 operates as a wireless data monitor that supplies probe data files via FTP to a network server 105 and backend display system. Probe data files contain location, time and sensor data along with administrative information. In operation, the vehicle tracking unit 200 uses a biased CAN line to wake-up and begin requesting a set list of previously defined probe data points. The probe data (e.g., sensor data) is requested periodically (e.g., once every minute) and stored to a file. GPS location data are also stored whenever a data set is recorded or a file transfer attempt is made. Files are transferred opportunistically, i.e., whenever the vehicle 115 is within range of a compatible wireless access point 110. The data is transferred to the access point 110 over a local area network (LAN) 125, over the Internet 100 to a network server 105 for back-end data management. The vehicle tracking unit 200 goes back into sleep mode when the vehicle's 115 reported key position is off and the CAN line bias has dropped. The vehicle tracking unit 200 indicates current status via three colored LEDs visible on the end of the unit 200, as conceptually illustrated in FIG. 4.

The unit 200 powers up upon receiving an initial 12V supply and thereafter when the CAN bias is raised above 1.1V. Typically, the unit 200 will always have 12V available from the vehicle 115 battery and will start on the bias change, but in the case of a disconnect or battery failure the unit 200 will power up when power is restored. Shutdown is initiated when the vehicle's 115 ignition is in a "Lock" position for a minimum amount of time (Approximately 1.5 minutes). The status of the ignition is requested from the unit 200 periodically (e.g., approximately every two seconds). If the unit 200 reports the ignition as being in the locked position 30 times consecutively (or does not respond at all) shutdown is initiated. The vehicle tracking unit 200 then turns off its CAN transceiver and waits 27 seconds for the CAN bias to drop. At the end of this time the status of the vehicle's 115 diagnostic CAN bus is checked. If there is less than 1.1V on the CAN high line of the diagnostic bus, the unit 200 will shutdown. Otherwise, the unit 200 is restarted.

Wireless communication via a hotspot (i.e., WAP) occurs if a compatible (e.g., 802.11x) connection to an open network exists and is detected. In a preferred implementation, probe files are sent via ftp to the network server 105. The unit 200 may create a new set of files at the beginning of each day or when no files for the current day are present. New probe files preferably include the unit 200 serial number and the date as a file name, and a counter in the file name extension for backend identification and ordering. Each file contains header information and a set or sets of probe data. If a connection is not available, then each new data set is appended to an existing daily file until such time as a connection becomes available.

The vehicle tracking unit 200 contains an embedded GPS receiver 210 (with an antenna 212) to provide location and time information. In a preferred embodiment, the unit 200 includes a battery backup as part of the power supply 235 to expedite the acquisition of a GPS lock and to power an internal clock to keep the current date and time. When the unit is powered up for the first time (out of box operation) it will not have a date or time. Upon acquisition of one satellite signal the unit 200 will output "GPS time," i.e., Coordinated Universal Time (UTC), which is the number of seconds since 00:00:00 UTC, Jan. 6, 1980, with an offset of several seconds (this offset is currently about 15 seconds and historically increases by a second every 18 months). From the first time the unit 200 is powered up, the GPS receiver 210 works to complete an almanac which contains information about every satellite in the constellation, ionospheric data and system messages. Once this almanac is complete the unit 200 will begin to output correct UTC time. The almanac also allows the unit 200 to obtain its GPS fix sooner the next time it is powered up. It takes roughly 15 minutes for the GPS unit to complete its almanac if it has a valid lock the entire time. To increase GPS availability newly installed units should be allowed to obtain a complete almanac as soon as possible. Until a unit has been allowed to obtain its first satellite fix, the date and time will be interpreted as zeros. Any data collected during this time may be invalid as it will not have an associated date and time. Also, if the unit loses its battery backup for any reason it may lose its almanac and stored date and time. If this happens, the unit 200 will need to repeat the steps required to acquire its almanac.

During normal operating conditions the GPS receiver 210 will generally obtain a fix in 45 seconds or less when first powered up if there are four valid satellites in view of the GPS receiver's 210 antenna. Any time the GPS receiver 210 has less than four satellites available it will be unable to calculate a GPS position and any location, speed or altitude recorded at this time will consist of all zeros. Due to the nature of GPS it is normal to occasionally lose a satellite lock. This can be caused by physical signal obstruction, signal degradation due to ionosphere and troposphere conditions, false information from reflected signals or other factors. One way to increase GPS availability is to allow the GPS receiver 210 to obtain a complete almanac when first installed and to mount a GPS antenna 212 in a location that has the widest view of the sky possible.

An important aspect of the invention is the method of naming data files to impart useful information while distinguishing each file that is created. In a preferred implementation, file names for data files contain three elements, the date, the unit's 200 serial number and a count number for the day. The name takes the form of MDDYSSSS.CCC, where:

M=current month as a hex number (i.e. January=1, October=A, November=B)

DD=current day as a two digit decimal number

Y=last digit of the year (i.e. 2006=6)

SSSS=four digit hex serial number unique to each vehicle tracking unit 200

CCC=three digit hex file count, incremented for each new file created in the same day.

By way of example, a file name created on Apr. 28, 2006, on an vehicle tracking unit 200 with a serial number of 0013 may appear as follows:

42860013.0000

As the exemplary file name format uses only one digit to display the year, the file names will experience a rollover for each new decade. However, this problem is merely a cosmetic one, as the file itself contains more complete date and time information and the backend server 105 will readily identify the date on which a file is transmitted.

Another important aspect of the invention is the method of formatting data files to efficiently provide useful data. In an exemplary implementation, files begin with two lines of header information. The first line of the exemplary header is detailed in FIG. 5. The second line of the header contains the vehicle's VIN, a 17 digit identifier unique to every vehicle.

Groups of location and operational data entries follow the header information. In a preferred implementation, each data entry consists of two lines. In an exemplary implementation, the first line of every data entry pair is the GPS data at the time of data collection. A line of GPS consists of the date and time, latitude, longitude, speed and altitude. These are displayed as follows:

UTC: YYYYMMDDHHMMSS (date and time; year, month, day, hours, minutes, seconds)

LATITUDE: +0000000 (latitude with two digits for degrees, two digits for minutes and four digits for fraction of minutes)

LONGITUDE: −000000000 (longitude with three digits for degrees, two digits for minutes and four digits for fraction of minutes)

GROUNDSPEED: 000000 (groundspeed in kilometers per hour)

ALTITUDE: 0000 (altitude above sea level in meters)

A sample line of GPS information is as follows:

UTC: 20060512092536 LATITUDE: +40192894 LONGITUDE: −078550790

GROUNDSPEED: 000016 ALTITUDE: 0346

In an exemplary implementation, the second line of a data entry contains the actual data collected. Individual parameters are separated by spaces. The data collected, in order, may include ambient temperature, vehicle speed, odometer reading, windshield wiper status and barometric pressure. These values are typically available from the CAN, including the ECU 245 and/or sensors, available on many modern vehicles. However, the invention is not limited to tracking those variables. Any conditions sensed by digital or analog sensors on a vehicle may be tracked. The tracked values are preferably written to the file as raw recorded hex values to conserve storage space and bandwidth. Conversion from raw value to actual units is accomplished using conversion factors as set forth in FIG. 6.

Any files from previous days that did not transfer on their day of creation may have additional GPS information lines applied to them. These lines may be appended for every transfer attempt until the file is able to transfer. Thus, the last GPS line in a file is from the time of successful transfer. An example of these appended GPS lines appears as follows:

TRANSFER ATTEMPT: UTC: 20060512092536 LATITUDE: +40192894 LONGITUDE: −078550790 GROUNDSPEED: 000016 ALTITUDE: 0346

Data lines at the end of a file may contain data loss codes due to the ECU 245 being in a powered down state. This may also occur at the beginning of a file or when a vehicle 115 is restarted or otherwise powered up. The backend system 105 may be configured to recognize and filter these data loss codes appropriately.

In a preferred embodiment, the unit 200 is configured to detect and connect to any available open compatible wireless network. When more than one wireless network is available at a time the unit 200 may attempt to connect using one of the available networks. If the unit 200 fails to connect, such as due to encryption or MAC filtering, it may wait to detect a new available network or attempt to connect to another network that has been already detected. To achieve roaming between access points, the unit 200 may utilize a soft boot.

In a preferred implementation, the microcontroller 205 includes a watchdog timer configured to trigger a system reset if the unit 200, due to some fault condition, such as a hang, neglects to regularly service the watchdog (e.g., writing a "service pulse" to it). The objective is to bring the system back from the hung state into normal operation. Thus, if for any reason the system was to lockup, the watchdog timer may be configured to restart the unit 200 after not being serviced for 8.388 seconds. Under normal conditions the watchdog timer is serviced regularly and code execution continues as normal.

If the ECU 245 fails to respond to specific requests, associated data may be stored as an impossible real value. For most data types, the value may be the highest possible value. In the case of the VIN, the value may be 17 consecutive 0's. The backend system 105 may be configured to recognize and process/filter these values appropriately.

Components designed to protect the electrical components from power surges and voltage spikes may also be provided. By way of example, a transient voltage suppression diode, varistor and/or gas discharge tube may be provided to protect the electronics from voltage spikes by shunting high voltage away from sensitive components.

Files are transmitted upon gaining network access. Only one data file per day will exist on the vehicle tracking unit 200 at a time. However, the vehicle tracking unit 200 can generate more than one file per day based upon connectivity and number of transmissions. Such files are distinguished by the counting extension. By way of example, the three digit file extension begins at .000 every day and counts up in hex as new file names are needed. The count starts over for each new day. Multiple files may be queued for transmission and sent chronologically or based on determined priorities so that files are received by the backend server 105 in a determined (e.g., chronological) order. This helps guard against spurious/incomplete reports generated by the server 105.

Advantageously, the exemplary unit 200 utilizes FTP for communicating files over the Internet. The backend FTP server 105, running FTP server software, listens on the network for connection requests from vehicle tracking units 200. Once connected, a vehicle tracking unit 200 can do a number of file manipulation operations, such as uploading files to the server. Optionally, for secure transmission, SFTP (SSH File Transfer Protocol) which is based on SSH, or FTPS (FTP over SSL), which adds SSL or TLS encryption to FTP may be utilized. Additionally, files may optionally be encrypted by the tracking unit 200 before transmission and decrypted by the backend server 105 upon receipt.

Figure 3:
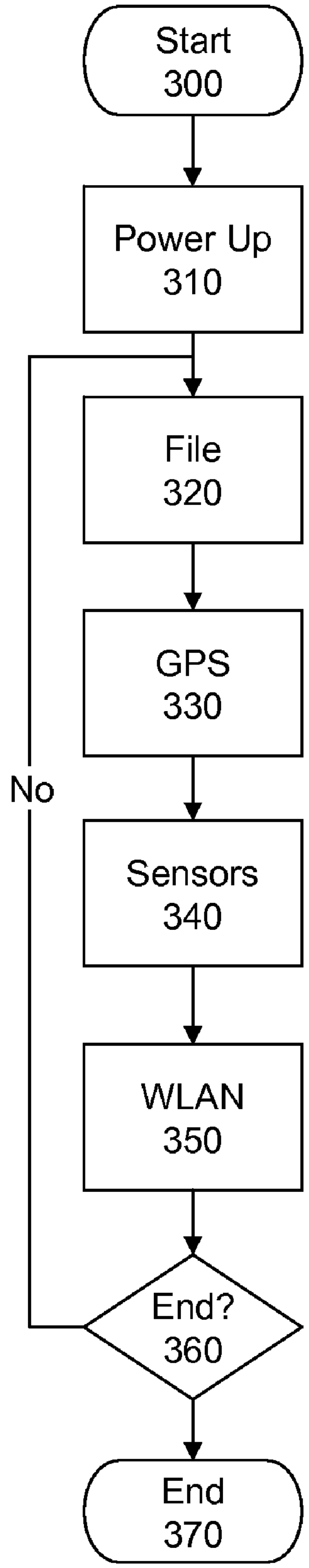
FIG. 3 provides a high level flowchart of an exemplary vehicle tracking methodology according to principles of the invention.

Referring now to FIG. 3, a high level flowchart of an exemplary vehicle tracking methodology 300 according to principles of the invention is provided. In step 310, the unit 200 powers up. A threshold voltage or current, such as an initial 12V supply and a subsequent CAN bias above 1.1V, may be provided to power up the unit 200.

Next, in step 320, the unit 200 creates a file (i.e., a probe file) to which data will be written. In a preferred implementation, the file is assigned a name based upon the date, the unit's 200 serial number and a count number for the day. The file is preferably formatted with header information that provides the unit serial number; software, firmware and hardware version information; a configuration file name, the date, file type and vehicle's VIN. Groups of location and corresponding operational data entries will be written to the file following the header information. In a preferred implementation, each data pair entry includes GPS data (i.e., date and time, latitude, longitude, speed and altitude) and corresponding operational data, such as ambient temperature, vehicle speed, odometer reading, windshield wiper status and barometric pressure.

Data acquisition steps are performed before, during and/or after creation of the file. In step 330, the GPS data is determined using a GPS receiver 210 and written by the microcontroller 205 to the file in memory 225. Likewise, in step 340, the operational data is obtained from the ECU 245, digital sensors 250 and/or one or more analog sensors 255 using interfaces 240 and/or an A/D converter 230 and written by the microcontroller 205 to the file in memory 225. The GPS and sensor data are preferably determined concurrently or time stamped, such that the GPS data defines the location of the vehicle at the time the operational data is determined. The data acquisition steps repeat, such that additional data may be acquired and added to the file at determined times or intervals and/or upon the occurrence of determined events.

Wireless communication occurs if a compatible (e.g., 802.11x) connection to an open network exists and is detected, as in step 350. In a preferred implementation, the unit 200 sends files via a compatible protocol (e.g., ftp) to the network server 105. After a file is sent, a new file is created and steps 320 through 350 repeat. The steps may repeat until a termination event 360 such as a power down occurs, at which time the process ends 370.

While an exemplary embodiment of the invention has been described, it should be apparent that modifications and variations thereto are possible, all of which fall within the true spirit and scope of the invention. With respect to the above description then, it is to be realized that the optimum relationships for the components of the invention and steps of the process, including variations in form, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A method of tracking a vehicle using a system and method for vehicular fleet monitoring, said method comprising steps of:

determining a location of a vehicle using a global positioning system;

determining a time at which the location of the vehicle is determined;

determining at least one operational parameter of the vehicle at the determined time;

creating a data file comprising a header and at least one data pair, said at least one data pair comprising the determined location of the vehicle and the corresponding at least one operational parameter, said header including a vehicle identifier and a tracking unit identifier;

determining when an open compatible wireless network connection with Internet access is available; and accessing the open compatible wireless network connection and transmitting the data file to a remote computer via the Internet using a compatible file transfer protocol.

2. A method of tracking a vehicle using a system and method for vehicular fleet monitoring according to claim 1, said method further comprising steps of powering up and shutting down the system based upon a CAN line bias.

3. A method of tracking a vehicle using a system and method for vehicular fleet monitoring according to claim 1, said method further comprising steps of powering up and shutting down the system based upon a CAN line bias, wherein the system is powered up when the CAN line bias is at least a first determined threshold amount, and the system is powered down when the CAN line bias drops below a second determined threshold amount.

4. A method of tracking a vehicle using a system and method for vehicular fleet monitoring according to claim 1, said method further comprising a step of powering up and shutting down the system based upon the status of the vehicle's ignition.

5. A method of tracking a vehicle using a system and method for vehicular fleet monitoring according to claim 1, said method further comprising requesting the at least one operational parameter periodically.

6. A method of tracking a vehicle using a system and method for vehicular fleet monitoring according to claim 1, said method further comprising requesting the at least one operational parameter periodically and determining location whenever the at least one operational parameter is determined.

7. A method of tracking a vehicle using a system and method for vehicular fleet monitoring according to claim 1, said method further comprising visibly indicating system status.

8. A method of tracking a vehicle using a system and method for vehicular fleet monitoring according to claim 1, wherein said step of creating a data file comprising a header and at least one data pair, said at least one data pair comprising the determined location of the vehicle and the corresponding at least one operational parameter, said header including a vehicle identifier and a tracking unit identifier, includes appending each data pair to the data file until the data file is transmitted, and upon transmission creating a new data file.

9. A method of tracking a vehicle using a system and method for vehicular fleet monitoring according to claim 1, wherein said step of creating a data file comprising a header and at least one data pair, said at least one data pair comprising the determined location of the vehicle and the corresponding at least one operational parameter, said header including a vehicle identifier and a tracking unit identifier, includes appending each data pair to the data file until the data file is transmitted, and upon transmission creating a new data file, and creating a file name for each data file said file name including a date, an identification number for the system and a count number for the date.

10. A method of tracking a vehicle using a system and method for vehicular fleet monitoring according to claim 1, said method further comprising creating an almanac, said almanac including GPS satellite information and determining a date and time from UTC time.

11. A method of tracking a vehicle using a system and method for vehicular fleet monitoring according to claim 1, wherein each of said at least one data pair includes a time of data collection.

12. A method of tracking a vehicle using a system and method for vehicular fleet monitoring according to claim 1, wherein each of said at least one data pair includes a time of data collection, latitude, longitude, groundspeed and altitude.

13. A method of tracking a vehicle using a system and method for vehicular fleet monitoring according to claim 1, wherein each of said at least one data pair includes a time of data collection, latitude, longitude, groundspeed and altitude and at least one operational parameter from the group consisting of ambient temperature, vehicle speed, odometer reading, windshield wiper status and barometric pressure.

14. A method of tracking a vehicle using a system and method for vehicular fleet monitoring according to claim 1, wherein each of said at least one data pair includes a time of data collection, latitude, longitude, groundspeed and altitude and at least one operational parameter from the group consisting of ambient temperature, vehicle speed, odometer reading, windshield wiper status and barometric pressure, said method further comprising writing the operational parameter to the data file as a raw recorded hexadecimal value.

15. A method of tracking a vehicle using a system and method for vehicular fleet monitoring according to claim 1, wherein each of said at least one data pair includes a time of data collection, latitude, longitude, groundspeed and altitude and at least one operational parameter from the group consisting of ambient temperature, vehicle speed, odometer reading, windshield wiper status and barometric pressure, said method further comprising writing the operational parameter to the data file as a raw recorded hexadecimal value, and then converting from the raw recorded hexadecimal value to actual units by applying a determined conversion factor.

16. A vehicle tracking unit comprising a microcontroller, a GPS receiver with a corresponding GPS antenna, a wireless network transceiver with a corresponding wireless network antenna, a memory, a power supply and one or more interfaces operably coupled by a bus, said microcontroller being adapted to provide supervisory logic control over the tracking unit, control the GPS receiver and wireless network transceiver, receive input from the GPS receiver, wireless transceiver and interfaces, and write to and read from the memory;

said GPS receiver being adapted to receive GPS satellite signals and calculate position and time based thereon;

said one or more interfaces including a means for communicatively coupling the microcontroller to a vehicle Electronic Control Unit and receiving operational data therefrom;

said bus being adapted to enable transfer of data and power between components; and said wireless network transceiver being adapted to detect and transmit GPS and operational data to a remote computer via an open wireless access point with an Internet connection using a determined file transfer protocol;

said microcontroller being configured to determine a location of the vehicle using GPS receiver, determine a time at which the location of the vehicle is determined, determining at least one operational data of the vehicle at the determined time, and create a data file comprising a header and at least one data pair, said at least one data pair comprising the determined location of the vehicle and the corresponding at least one operational data, said header including a vehicle identifier and a tracking unit identifier; determine when an open compatible wireless network connection with Internet access is available using said wireless network transceiver; and accessing the open compatible wireless network connection and transmitting the data file, using said wireless network transceiver, to a remote computer via the Internet using a compatible file transfer protocol.

17. A vehicle tracking unit according to claim 16, wherein the data file includes a plurality of data pairs appended to the data file until the data file is transmitted.

18. A vehicle tracking unit according to claim 16, wherein said microcontroller is configured to create a new data file upon transmission the data file, and configured to create a file name for each data file said file name including a date, an identification number for the unit and a count number for the date.

19. A vehicle tracking unit according to claim 16, wherein said microcontroller is configured to create an almanac using said GPS receiver, said almanac including almanac data corresponding to the GPS satellite signals:

each of said at least one data pair includes a time of data collection, latitude, longitude, groundspeed and altitude and at least one operational parameter from the group consisting of ambient temperature, vehicle speed, odometer reading, windshield wiper status and barometric pressure, said unit further being configured to write the operational parameter to the data file as a raw recorded hexadecimal value.

20. A vehicle tracking unit according to claim 16, wherein each of said at least one data pair includes a time of data collection, latitude, longitude, groundspeed and altitude and at least one operational parameter from the group consisting of ambient temperature, vehicle speed, odometer reading, windshield wiper status and barometric pressure, said unit being configured to write the operational parameter to the data file as a raw recorded hexadecimal value.

* * * * *